Feb. 24, 1970   W. FISCHER ET AL   3,497,120
DEVICE FOR THE PRODUCTION OF BLANKS OF EQUAL VOLUME AND
THEIR DISTRIBUTION
Filed Dec. 12, 1967   2 Sheets-Sheet 1

Feb. 24, 1970  W. FISCHER ET AL  3,497,120
DEVICE FOR THE PRODUCTION OF BLANKS OF EQUAL VOLUME AND
THEIR DISTRIBUTION
Filed Dec. 12, 1967  2 Sheets-Sheet 2

United States Patent Office 3,497,120
Patented Feb. 24, 1970

3,497,120
DEVICE FOR THE PRODUCTION OF BLANKS OF EQUAL VOLUME AND THEIR DISTRIBUTION
Walter Fischer, Pottschach, and Albert Rieder, Marchtrenk, Austria, assignors to Semperit Osterreichisch - Amerikanische Gummiwerke Aktiengesellschaft, Vienna, Austria, a corporation of Austria
Filed Dec. 12, 1967, Ser. No. 689,995
Int. Cl. B26f 3/00, 3/02; B65h 35/00
U.S. Cl. 225—96
8 Claims

ABSTRACT OF THE DISCLOSURE

A device for cutting of blanks for later fabrication in a device such as an extruder or injection molding machine, and for metering exact and uniform volumes of the blanks. The blanks are cut on the roller from a sheet emerging from the nip of a compounding mill, first in transverse direction, then longitudinally. In lieu of transverse cuts, notches might be imparted to the sheet which then is torn. The blanks thus cut are conveyed to storage boxes assigned to the fabricating machine in predetermined quantities. The latter are set by programmed control devices, and counting is accomplished by, e.g., a photocell. The conveyor is provided with means which diverts the excess of the predetermined number of blanks for further use.

---

Metering of materials used, for instance, high-polymer compounds for extrusion or injection molding, hitherto had been carried out by weight and usually by hand, using scales. Due to the always occurring inaccuracies and also due to inevitable differences in specific gravity of the compounds, it had not been possible to exactly meter these compounds because the correct loading of extruders and injection molding machines is controlled by the volume rather than the weight of the compound used. Fluctuations in specific gravity even occur when the composition of the material remains the same because it depends to a large extent upon the operating temperature and the atmospheric humidity. Consequently, faulty end products are obtained or products having excessive flash, in which case material is wasted.

It is the object of the invention to provide a process and device whereby metering of the required amount of compound is carried out by volume and fully automatically. This is accomplished by cutting blanks out of a sheet of the material to be used in the extruder or injection molder. These blanks are continuously cut from a sheet of uniform thickness directly on the sheet-carrying roll of a compounding mill and are carried off; they are counted mechanically, electrically or manually and then are assigned to the extruder or injection molder in exactly the volume required for the end product in the appropriate quantities.

In order to obtain blanks of equal volume, the sheet first is cut or notched by a transverse cutting wheel in equal distances and then is cut, by two rotating cutting discs, into strips or into blanks, respectively, depending upon whether the first operation had been a cut or a notch. In the latter instance, a tear-off device is provided by which the strip is separated into single parts along the notches.

The parts thus obtained are automatically counted, preferably by means of a photocell and, for measuring purposes, are assigned in appropriate quantities to the ensuing extrusion or injection molding machine, or other fabricating device.

The invention now will be more fully explained with reference to the accompanying drawings. However, it should be understood that these are given merely by way of illustration, and not of limitation, and that it is intended to cover all modifications and variations which do not constitute a departure from the spirit and the scope of the invention as hereinafter claimed.

Figure 1:
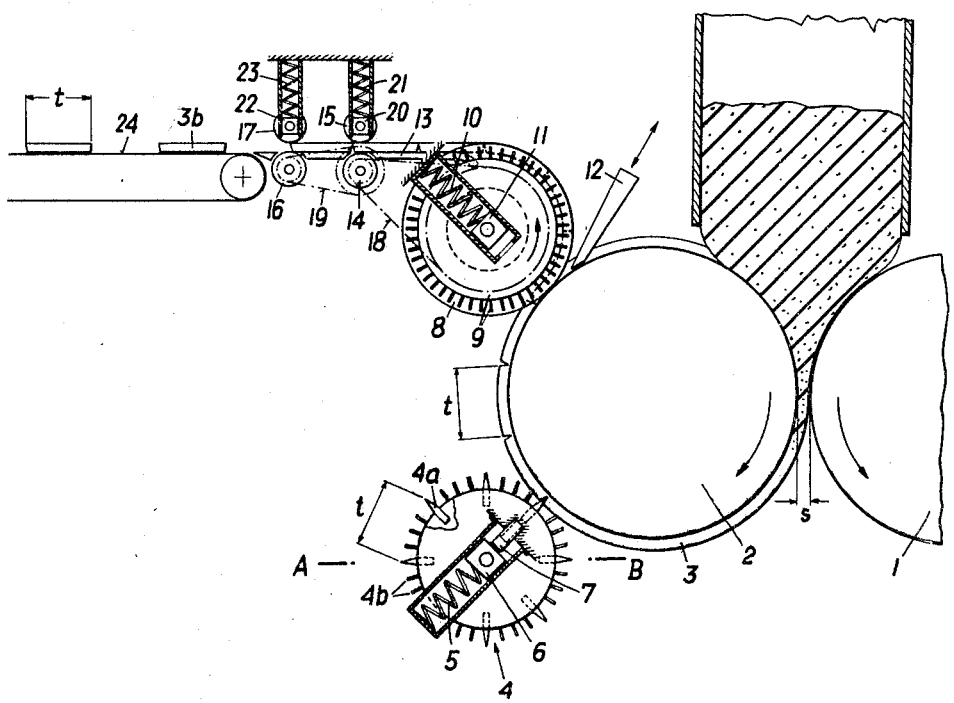
Figure 2:
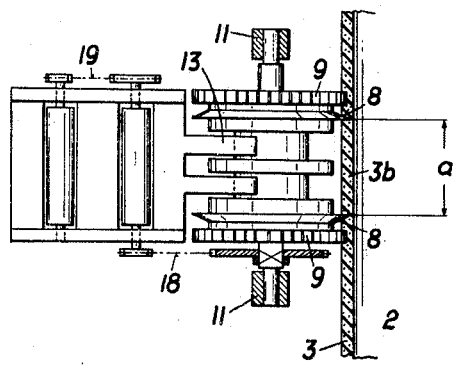
Figure 3:
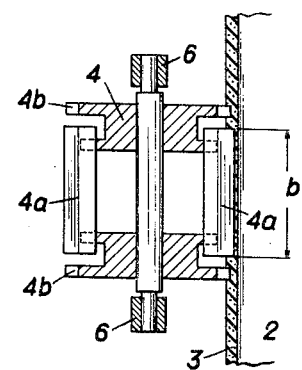
Figure 4:
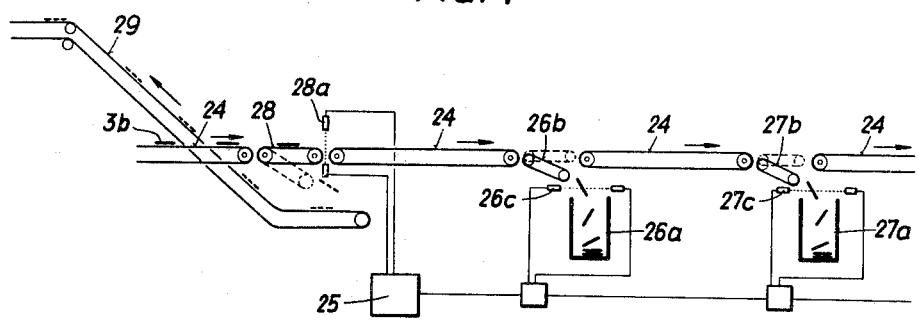

In the drawings,
FIG. 1 is an elevation of the cutting device;
FIG. 2 is a plan view of the device;
FIG. 3 is a section taken along lines A–B of FIG. 1; and
FIG. 4 is an elevation of a metering device.

Referring now to these drawings, a compounding mill consists of the rollers 1 and 2, in the nip of which the compound, such as a high-polymer, to be extruded or injection-molded, is disposed. The compound forms a continuous sheet 3 which is carried on roller 2. The sheet 3 first meets rotating transverse cutting wheel 4 provided with radially disposed knives 4a whose mutual distances $t$ are equal. Both sides of wheel 4 also are provided with carrier blades 4b which are arranged thereon in the manner of teeth on a gear. The distance between these blades 4b is so small that at least two of them always are in contact with the sheet 3. Carrier blades 4b thus effect equal peripheral speed of transverse wheel 4 and roller 2 so that the knives 4a cut transversely into sheet 3 at equal distance $t$.

The knives 4a are pressed into sheet 3 with the aid of springs 5 which press against bearings 6 of transverse wheel 4. In order to fix the depth of the transverse notches, adjustable stops 7 are provided on the sides of bearings 6 which face roller 2.

The sheet then is cut by the rotary knives or cutting discs 8 which are disposed on a common shaft in parallel position relative to each other, and a strip or band 3a is thus produced. The knives 8 are synchronized with shaft 2 in a manner analogous to that of the transverse cutting wheel 8 by means of carrier blades 9 which are arranged outside the cut strip 3a. Springs 10 act on the bearings 11 of knives 8 and urge them into the sheet 3. An adjustable scraper 12 diverts the strip 3a thus cut from the roller surface. Strip 3a first follows the cutting discs 8 and then slides over a pointed blade 13 to traverse thereafter a tearing device consisting of paired rollers 14, 15 and 16, 17, respectively. The lower rollers 14 and 16 are turned by chain drives 18 and 19 connected to the rotating discs 8 whereas the upper rollers 15, 17 idle and are pressed against strip 3a by bearings 20, 22 under the action of springs 21, 23. The transmission ratios of chain drives 18 and 19 are selected so that rollers 14 and 15 rotate with the same peripheral speed as cuting discs 8, while rollers 16 and 17 turn at higher speed. Thus, the strip 3a, clamped by the roller pairs 14, 15 and 16, 17, respectively, has a higher speed at the second pair 16, 17 than at the first pair 14, 15, and is torn into blanks 3b at its transverse notches between these two roller pairs, and these blanks 3b are carried by conveyor 24 to discharge boxes 26a, 27a which are part of the fabricating machine for further use of the cut material. The fabricating machine is not shown in the drawing, and as stated, may be an extruder, injection molding machine, or the like. Because in general different volume quantities of the material to be processed are introduced, the volume of the cut parts 3b advantageously is selected so that is the largest common divisor of this volume. The volume of the blanks 3b is governed solely by the size of the gap $s$ between the rollers 1 and 2, called the "nip," the distance of knives 4a of transverse wheel 4, and the distance $a$ between the two rotary knives 8.

The required quantity of cut blanks 3b is assigned to each molding press or extruder fully automatically by means of a programmed control 25. The number of cut blanks which may vary with the end use is predetermined and set on the programmed control. Conveyor 24 guides the blank pieces successively to the discharge boxes 26a, 27a, and more, as required. Above each of these, the conveyor 24 has a break at which a swingable connecting piece 26b, 27b, and so forth, is disposed. The connecting pieces are swiveled by means of a pneumatic cylinder and piston (not shown in the drawings).

Compressed air is fed into the pneumatic cylinders by conventional solenoid valves (not shown) which are actuated by the programmed control 25. When the connecting pieces 26b, 27b, and so forth, are in horizontal position, they bridge the break of conveyor 24 for the blanks 3b. However, when the connecting piece 26b, 27b, etc., is swung downwardly in oblique position, the blanks 3b drop into the assigned discharge boxes 26a, 27a, etc. The number of blanks 3b to be used in one operation of the extruder, injection molder or the like, is counted by photocells 26c, 27c, and so forth and is metered by the programmed control 25. As soon as the predetermined quantity of cut blanks 3b is present in the discharge boxes 26a, 27a, etc., the programmed control acts on one or more of the connecting pieces 26b, 27b, etc., which regain their horizontal position thereby, and the connecting piece assigned to an unfilled or incompletely filled box is tilted downwardly. The conveyor 24 is provided with another break before the discharge boxes where another swingable connecting piece 28 is provided. At the end of the break, another photocell 28a is disposed which counts the total number of blanks 3b conveyed and transmits the count to the programmed control 25. When the total number coincides with the sum of the blanks assigned by control 25 for loading of the individual boxes 26a, 27a, etc., control 25 effects a downward tilt of connecting piece 28, and the excess of blanks 3b drops onto a second conveyor 29 which takes them back for further distribution.

The device shown in the drawing has no provision for automatic loading of the extruder or injection molding machine from boxes 26a, 27a, etc. This can be accomplished by any known means, i.e., fully or semi-automatically or manually.

The device according to the invention assures equal volume of all blanks because they are cut entirely from the sheet stretched on the rollers. After release of a strip from the roller surface, the shrinkage occurring in the material processed therefore has no bearing on the volume with the process according to the invention.

What is claimed is:

1. A device for the cutting of blanks from a high-polymer sheet formed in the nip of a compounding roller mill and for their transportation to a fabricating machine in predetermined volumetric quantities, said device, comprising, in combination, a rotating wheel disposed above the roller carrying said sheet; a plurality of equally spaced transverse cutting knives disposed radially about said wheel at a distance from said roller which facilitates transversely notching of said sheet; a set of two parallel rotating cutting discs disposed so as to follow said wheel in the turning direction of said roller, said discs cutting said sheet in longitudinal direction; means for tearing said notches apart following said roller, thus cutting blanks of equal size and volume out of said sheet; carrying means for said sheet on said wheel and behind said set of discs; a conveyor; a plurality of storage boxes for the blanks assigned to said fabricating machines; counting means for said blanks being transported from said tearing means to said boxes; means for programmed control of the number of blanks to be carried to each storage box; and means for diverting the excess of blanks over the programmed number.

2. The device as defined in claim 1, wherein said carrying means on said wheel is a plurality of carrier blades effecting equal peripheral speed of said wheel and said roller; said blades being arranged about said wheel in the manner of gear teeth and at a mutual distance so that at least two blades always are in contact with said sheet.

3. The device as defined in claim 1, wherein said set of discs is disposed on a common axle; supported by bearings, and provided with spring means which urge bearings and knives against said roller.

4. The device as defined in claim 1, wherein a scraper is interposed between said roller and said discs to lift the notched sheet off said roller.

5. The device as defined in claim 1, wherein said tearing means are two idling upper rollers provided with means to urge them against said sheet; and two corresponding lower rollers, connected by synchronized drive means to said rotating discs at like peripheral speed.

6. The device as defined in claim 1, wherein said counting means for the blanks is a photocell.

7. The device as defined in claim 1, wherein said conveyor is provided with first breaks under control of said programming means and said counting means; said breaks coinciding with said storage boxes and being in obliquely downward position for loading of the boxes, and in straight alignment with the conveyor surface when in non-loading position; and with a second break of like construction as said first breaks, also under the same controls, and carrying off excess blanks for further disposition.

8. A device for the cutting of blanks from a high-ploymer sheet formed in the nip of a compounding roller mill and for their transportation to a fabricating machine in predetermined volumetric quantities, said device comprising, in combination, a rotating wheel disposed above the roller carrying said sheet; a plurality of equally spaced transverse cutting knives disposed radially about said wheel at a distance from said roller which facilitates transversely notching of said sheet; a plurality of carrier blades arranged about said wheel in the manner of gear teeth and spaced so that at least two blades always are in contact with said sheet, effecting equal peripheral speed of said wheel and said roller; a set of parallel rotating cutting discs after said wheel, seen in the travel direction of said sheet, longitudinally cutting the same; a common axle for said discs; and bearing and spring means for said discs disposed on said axle; a tearing device comprising two upper idling rollers provided with support and spring means to urge them against said sheet; two corresponding lower rollers, connected by drive means to said common shaft and synchronized to rotate at like speed therewith; a pointed blade disposed between said tearing device and said discs for further transporting said sheet; a conveyor leading the blanks produced in said tearing device to storage boxes assigned to said fabricating machine; first breaks in said conveyor, one assigned to each storage box, disposed in oblique downward position when loading said box and in alignment with conveyor surface in non-loading position; a second break in said conveyor of like construction as said first breaks to remove any excess over the predetermined quantities; a photocell assigned to said conveyor, counting the number of blanks to be loaded; and programming means acting on said conveyor breaks.

References Cited

UNITED STATES PATENTS

| | | | |
|---|---|---|---|
| 965,598 | 7/1910 | Price | 225—100 |
| 2,456,699 | 12/1948 | Hanson et al. | 225—100 X |
| 2,807,390 | 9/1957 | Bonebrake | 225—100 X |

JAMES M. MEISTER, Primary Examiner

U.S. Cl. X.R.

18—2; 225—100